United States Patent [19]

Cremer et al.

[11] 3,859,419

[45] Jan. 7, 1975

[54] PROCESS FOR THE MANUFACTURE OF PHOSPHOROUS ACID

[75] Inventors: Joseph Cremer, Hermulheim; Willi Martin, Bruhl, both of Germany

[73] Assignee: Knapsack Aktiengesellschaft, Knapsack near Cologne, Germany

[22] Filed: Dec. 29, 1972

[21] Appl. No.: 319,464

[30] Foreign Application Priority Data
Jan. 7, 1972 Germany............................ 2200653

[52] U.S. Cl.................................... 423/316, 23/263
[51] Int. Cl............................................. C01b 25/16
[58] Field of Search......................... 423/316, 259.2

[56] References Cited
UNITED STATES PATENTS
2,670,274  2/1954  Jones................................. 423/316
3,415,624  12/1968  Cremer............................... 423/316

*Primary Examiner*—Oscar R. Vertiz
*Assistant Examiner*—Gregory A. Heller
*Attorney, Agent, or Firm*—Connolly and Hutz

[57] ABSTRACT

Phosphorous acid is produced from phosphorus trichloride and water. To this end, the finely divided starting materials are introduced into a reaction zone, intimately mixed and reacted therein, in gas phase at temperatures between 150° and 200° C. More particularly, the phosphorus trichloride is sprayed into a reaction zone jointly with water using steam as the spray-inducing means, an inert gas is passed through the liquid reaction product in a further separation zone separate from the evaporation zone; and gases issuing from the said further separation zone are delivered to the atmosphere, without passage through the separation zone receiving gaseous reaction products.

4 Claims, 1 Drawing Figure

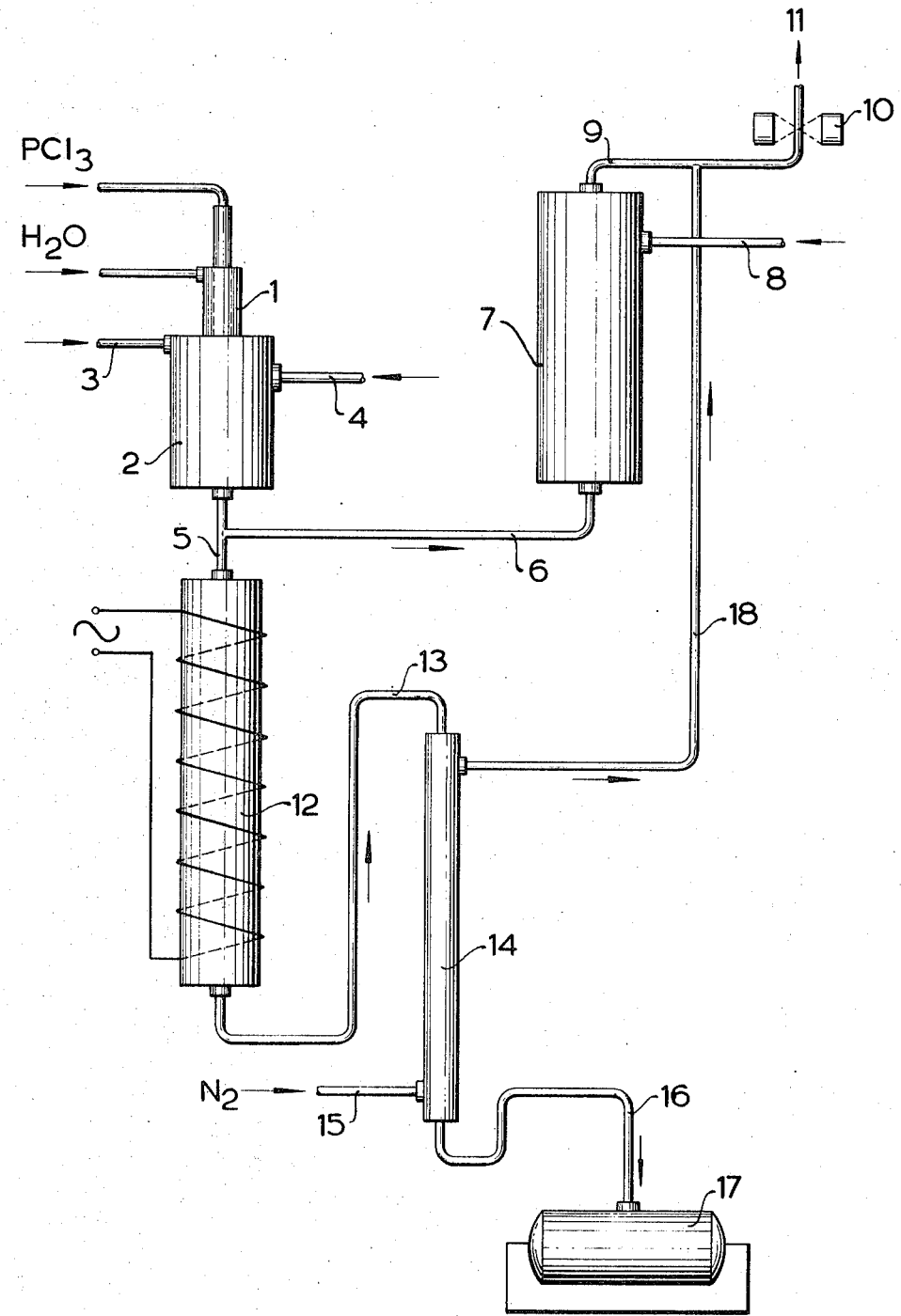

PROCESS FOR THE MANUFACTURE OF PHOSPHOROUS ACID

The present invention relates to a process and apparatus for the manufacture of phosphorous acid from phosphorus trichloride and water as starting materials, which comprises introducing the finely divided starting materials into a reaction zone; intimately mixing the starting materials and reacting them therein, in gas phase at temperatures between 150° and 200° C; conveying resulting gaseous reaction products to the atmosphere, through a separating zone and preferably through a hydrogen chloride absorption system; delivering resulting liquid reaction product to an evaporation zone and concentrating it therein so as to produce a melt, flowing an inert gas therethrough and removing the melt.

A similar process and apparatus have already been described in German Patent Specification 1,206,406.

This latter process, of which the chemistry appears to indicate that $PCl_3$ is hydrolyzed in gas phase, substantially comprises finely dividing the $PCl_3$ and $H_2O$ starting materials so as to enable more rapid reaction and fairly simultaneously mixing the starting materials together and reacting them. The components can be sprayed mechanically in conventional manner through single or two-opening nozzles using air, nitrogen or $CO_2$ as the spray-inducing means, and mixed together with the use of steam. This is not fully satisfactory, however, as the spraying is effected using additional inert gases as the spray-inducing means. These, however, are ballast materials which affect the reaction and considerably affect the throughput for a given volume of apparatus, i.e., reduce the apparatus' capacity.

We have now unexpectedly discovered that it is possible by appropriately modifying the process reported in the above German Patent Specification to improve the yield and quality of phosphorous acid and increase the capacity of the apparatus used for making it. To this end, the present invention provides for the phosphorus trichloride and the water to be sprayed together by means of steam; for an inert gas to be passed through the reaction product in a further separation zone separate from the evaporation zone; and for the gases issuing from the said further separation zone to be delivered to the atmosphere, without passage through the separation zone receiving the gaseous reaction products. The gas coming from said further separation zone should more conveniently be delivered to the atmosphere via the hydrogen chloride absorption system.

The separating zone receiving the gaseous reaction products should preferably be fed with the quantity of water and/or phosphorous acid, which is necessary to maintain a maximum temperature between 150° and 200° C, preferably 160° and 190° C, therein. It has also been found advantageous to inspect the gases issuing from the separation zones as to the formation of smoke and to regulate the supply of starting materials in accordance therewith.

In view of the fact that the steps of mixing the starting materials together and spraying them are both carried out with the use of steam, it is unnecessary to use further inert gases as the spray-inducing means. As a result, the liquid $PCl_3$ and $H_2O$ reactants are finely sprayed and at the same time they are particularly rapidly and uniformly heated to the desirable reaction temperature.

Following the start of the reaction and following liberation of the heat of reaction, it is possible for the water with its high evaporation heat to act — this in a manner analogous to that described in the above earlier process — as an intensive so-called inner coolant inhibiting temperature rises and decomposition of the $H_3PO_3$ produced. We have also discovered that the quality of the final product can be improved by completely dehydrochlorinating and cooling the $H_3PO_3$-melt in a column rather than in the evaporator itself, the column being placed downstream of the evaporator, and by uniting the gas mixture issuing from the column with the off-gases coming from other structural elements forming part of the apparatus, just ahead of the HCl-absorption system. The increase in capacity rendered possible thereby for an apparatus having a given volume is critically determined by the temperature rise in the reflux column, as increasing quantities of $PCl_3$ are carried along thereinto at increasing flow velocities and undergo belated reaction therein. While high reaction temperatures have been found to promote the formation of highly concentrated $H_3PO_3$, the fact remains that the use of temperatures higher than substantially 200° C increasingly effect the decomposition of $H_3PO_3$ in the gas phase, inter alia in accordance with the equation $4 H_3PO_3 \rightarrow 3 H_3PO_4 + PH_3$. It should not be ignored, however, that both the resulting $PO_4$-content in the final product and the $PH_3$ which appears in the exhaust gas are undesirable.

The introduction of definite proportions of $H_2O$ and/or dilute $H_3PO_3$ into the reflux column has now been found to enable a desirable optimum temperature range between 160° and 190° C to be established therein and the throughput and energetic balance of the system to be further improved. The introduction of these relatively small proportions of liquid matter into the upper portion of the column has also been found completely to move the equilibrium of the gas phase hydrolysis to the $H_3PO_3$ side and to thereby increase the yield up to substantially 98 %. Still further, the purity and quality of the final product are considerably improved. As compared with products made by the conventional process, it was possible to increase the $H_3PO_3$-concentration up to 99.5 %, to reduce the $PO_4$-content from formerly less than 1.4 % down to less than 0.2 %, and the chloride content from formerly less than 500 ppm (ppm stands for parts per million) down to less than 10 ppm.

In order to have optimum conditions in carrying out the process of the present invention, it is also necessary to take specific steps which are intended to stabilize the reaction and, in the end, to minimize control and maintenance. In this connection, it has been found advantageous to supply the liquid starting materials, particularly the $PCl_3$-reactant, with the use of dosing pumps. These are very useful as they enable the apparatus to be fed with constant quantities of material and enable the reactor and reflux column to be set to pulsating operation. Especially in those cases in which the quantity control is achieved mechanically and the supply of liquid feed material is controlled by means of valves, it is advantageous to provide a photo-electric safety device monitoring and inspecting the off-gas for clearness. This is desirable in view of the fact that underfeeding or overfeeding of $PCl_3$ and/or $H_2O$ if it ever occurs — for example as a result of unexpected sudden changes in the cross-sectional area caused by foreign substances — has been found to entail temperature rises which effect the decomposition of $H_3PO_3$ and, in the end, effect strong formation of smoke in the issuing gas. As soon as this is the case, the photo-electric safety device, which responds thereto, and a control element placed downstream thereof, for example a pneumatic valve, cause the supply of $PCl_3$ to be reduced or stopped.

The process of the present invention should preferably be carried out in the exemplary apparatus shown diagrammatically in the accompanying drawing.

As can be seen, a reactor (2) is fitted at its upstream end with a two-opening nozzle (1) supplying $PCl_3$ and $H_2O$ and with a steam inlet (3) opening against the orifice relief of nozzle (1), the two nozzle openings being preferably arranged coaxially with respect to one another. The reactor (2) should conveniently be provided with a second steam inlet (4) projecting laterally thereinto and supplying the reactor with steam for mixing the reaction components together.

A branch conduit (6) connecting the downstream end of reactor (2) to an evaporator (12) is arranged to run to a separator (7), which takes the form of a reflux condenser. At its upstream end, separator (7) is provided with a feed pipe (8) supplying water and/or $H_3PO_3$ and with an off-gas outlet (9) which runs from separator (7) through a photo-electric safety device (10) to a conventional HCl-absorption system (11) (not shown in the drawing).

A conduit (13) runs from the downstream end of evaporator (12) to a stripping column (14). A $H_3PO_3$-melt is introduced thereinto from above and nitrogen is introduced from below, the nitrogen coming through conduit (15) travelling upwardly in column (14) countercurrently with respect to the melt. The purified and concentrated $H_3PO_3$-melt is removed through the downstream end of column (14) and conveyed through outlet (16) to a crystallizer (17), whilst the gases are removed near the upstream end of column (14) through conduit (18), which is connected to conduit (9) and opens thereinto at a place between separator (7) and photo-electric safety device (10).

The following Examples further illustrate the process of the present invention and its technically beneficial effects.

EXAMPLE 1

A reactor was fed with 36 kg/h of $PCl_3$ which were sprayed thereinto through a two-opening nozzle using 1.5 cubic meters per hour of $N_2$ as the spray inducing means. The reactor was fed simultaneously with 70 kg/h of steam. The reaction temperature varied between 170° and 190° C. It was 190° C in the continuous heater. To remove residual $H_2O$ and HCl, the heater was fed with 3.0 cubic meters/h of $N_2$. The off-gases coming from the reactor and evaporator were delivered to a separator which took the form of a reflux column.

20 kg/h of a 97 % $H_3PO_3$ were obtained in a yield of 93 %. The $H_3PO_3$ contained 0.9 % of $PO_4$ and 300 ppm of Cl.

EXAMPLE 2

A reactor the same as that used in Example 1 was fed with 56 kg/h of $PCl_3$ and 18 l/h of $H_2O$ which were jointly sprayed thereinto and heated by means of 100 kg/h of steam. The temperature varied between 170° and 180° C. It was 210° C in the continuous heater. Residual water and hydrogen chloride were removed and the $H_3PO_3$-melt was cooled in a stripping column which was placed downstream of the evaporator and which was fed with 2.0 cubic meters/h of $N_2$. The off-gases coming from the stripping column were united with the off-gases coming from the reactor, downstream of the separator.

32 kg/h of 98 % $H_3PO_3$ were obtained in a yield of 96 %. The acid contained 0.5% of $PO_4$ and 100 ppm of Cl.

EXAMPLE 3

A reactor the same as that used in Examples 1 and 2 was fed with 116 kg/h of $PCl_3$ and 25 l/h of $H_2O$ which were jointly sprayed thereinto and heated by means of 120 kg/h of steam. A further 12 l/h of $H_2O$ or 15 l/h of a 20 % $H_3PO_3$ were introduced into the head of the separator, which was a reflux column.

The reaction temperature varied around 185° C. It was 214° C in the continuous heater. To remove residual $H_2O$ and HCl and to cool the $H_3PO_3$-melt, the stripping column was supplied with 4 cubic meters/h of $N_2$.

The off-gases coming from the stripping column and the off-gases coming from further parts of the apparatus were united downstream of the separator.

68 kg/h of $H_3PO_3$ with a strength of more than 98.5 % were obtained in a yield of 98.0 %. The acid contained 0.2 % of $PO_4$ and 10 ppm of Cl.

The yields obtained in the above Examples are based on P in the $PCl_3$ and the percentages are by weight.

We claim:

1. In the process for the manufacture of phosphorous acid from phosphorous trichloride and water as starting materials by introducing the finely divided starting materials into a reaction zone I, intimately mixing the starting materials and reacting them therein, in the gas phase at temperatures between 150° and 200° C, delivering the resulting liquid reaction product to an evaporation zone II and concentrating it therein so as to produce a melt, blowing an inert gas therethrough, removing the melt obtained and conveying the resulting gaseous reaction products to the atmosphere, through a gas-separating zone III, the improvement which comprises the steps of finely dividing and intimately mixing the starting materials by stream-spraying jointly into the reaction zone I the phosphorous trichloride and the water, concentrating the liquid reaction product to a melt within the evaporation zone II, conveying the gaseous reaction products of the zones I and II loaded with unhydrolyzed $PCl_3$ to the gas-separating zone III, to which water or diluted phosphorous acid is fed in a quantity necessary to hydrolyze the $PCl_3$ and to maintain a maximum temperature between 150° and 200° C therein, feeding the melt from the evaporation zone II to a further separation zone IV located outside of the evaporation zone II, and blowing therein through the melt and inert gas, with the resultant formation of highly concentrated phosphorous acid of high purity and discharging the off-gas from the separation zone IV to the atmosphere without passing it through the gas-separating zone III.

2. The process as claimed in claim 1, wherein the gas-separating zone III is fed with a quantity of water or phosphorus acid necessary to maintain a maximum temperature between 160° and 190° C therein.

3. The process as claimed in claim 1 wherein the gas coming from said further separation zone IV is delivered to the atmosphere via the hydrogen chloride-absorption system.

4. The process as claimed in claim 1, wherein the gases issuing from the separation zones III and IV are inspected as to the formation of smoke and the supply of starting materials is regulated in accordance therewith.

* * * * *

UNITED STATES PATENT OFFICE
CERTIFICATE OF CORRECTION

PATENT NO. : 3,859,419
DATED : January 7, 1975
INVENTOR(S) : Joseph Cremer; Willi Martin It is certified that error appears in the above-identified patent and that said Letters Patent are hereby corrected as shown below:

Change the Assignee's name from "Knapsack Aktiengesellschaft, Knapsack near Cologne, Germany" to -- Hoechst Aktiengesellschaft, D 6230 Frankfurt/Main-80, Germany --.

Signed and Sealed this twenty-seventh Day of January 1976

[SEAL]

Attest:

RUTH C. MASON
Attesting Officer

C. MARSHALL DANN
Commissioner of Patents and Trademarks